US006644171B2

(12) United States Patent
Styron et al.

(10) Patent No.: US 6,644,171 B2
(45) Date of Patent: Nov. 11, 2003

(54) VARIABLE COMPRESSION CONNECTING ROD

(75) Inventors: Joshua Putman Styron, Canton, MI (US); Pravin Sashidharan, Inkster, MI (US); V. Durga Nageswar Rao, Bloomfield Hills, MI (US); Yash Andrew Imai, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 09/682,682

(22) Filed: Oct. 5, 2001

(65) Prior Publication Data

US 2003/0066418 A1 Apr. 10, 2003

(51) Int. Cl.$^7$ .................................................. F01B 31/14
(52) U.S. Cl. ........................................ 92/60.5; 123/48 B
(58) Field of Search ...................... 92/60.5; 123/48 B, 123/78 E, 78 F (56) References Cited

U.S. PATENT DOCUMENTS

| 4,246,873 A | 1/1981 | Lih-Liaw |
| 4,286,552 A | 9/1981 | Tsutsumi |
| 4,370,901 A | 2/1983 | Bolen |
| 4,469,055 A | 9/1984 | Caswell |
| 4,934,347 A | 6/1990 | Suga et al. |
| 4,979,427 A | 12/1990 | Pfeffer et al. |
| 5,146,879 A | 9/1992 | Kume et al. |
| 5,165,368 A | 11/1992 | Schechter |
| 5,331,928 A | 7/1994 | Wood |
| 5,417,185 A | 5/1995 | Beattie |
| 5,562,068 A | 10/1996 | Sugimoto et al. |
| 5,724,863 A | 3/1998 | Kramer et al. |
| 5,865,092 A | 2/1999 | Woudwyk |
| 5,960,750 A | 10/1999 | Kreuter |
| 6,223,703 B1 | 5/2001 | Galvin |

FOREIGN PATENT DOCUMENTS

| DE | 19757871 A1 | 7/1999 |
| JP | 3-092552 | 4/1991 |
| JP | 6-241058 | 8/1994 |

OTHER PUBLICATIONS

"Variable Compression Ratio (VCR) Crank Mechanism", Victor Gheorghiu, University of Applied Sciences, Hamburg, Germany, 1 pp.
"New Saab and Citroen Technology at Geneva", Automotive Engineering International, May 2000, pp. 96, 97.
U.S. patent application Ser. No. 10/003,355, filed Nov. 15, 2001, entitled "Variable Compression Ratio Engine".

*Primary Examiner*—F. Daniel Lopez
(74) *Attorney, Agent, or Firm*—David S. Bir (57) ABSTRACT

A connecting rod assembly is provided for varying a compression ratio of an internal combustion engine having a crankshaft and a piston. The connecting rod assembly includes a first portion adapted to be connected to the crankshaft, and a second portion adapted to be connected to the piston and movable with respect to the first portion. The connecting rod assembly further includes a locking mechanism disposed between the first and second portions. The locking mechanism includes a rotatable locking element that is configured to lock the second portion at a first position relative to the first portion. Furthermore, the first position corresponds to a first compression ratio of the engine.

32 Claims, 7 Drawing Sheets

VARIABLE COMPRESSION CONNECTING ROD

BACKGROUND OF INVENTION

1. Field of the Invention

The invention relates to a variable compression connecting rod for use with an internal combustion engine.

2. Background Art

A "compression ratio" of an internal combustion engine is defined as the ratio of the volume in a cylinder above a piston when the piston is at bottom-dead-center (BDC) to the volume in the cylinder above the piston when the piston is at top-dead-center (TDC). The higher the compression ratio, the more the air and fuel molecules are mixed and compressed, thereby resulting in increased efficiency of the engine. This in turn results in improved fuel economy and a higher ratio of output energy versus input energy of the engine.

In conventional internal combustion engines, however, the compression ratio is fixed and cannot be changed to yield optimal performance. Accordingly, variable compression ratio (VCR) internal combustion engines have been developed to vary the clearance volume of a cylinder in order to achieve improved fuel economy and increased engine power performance. Such VCR engines are designed to have a higher compression ratio during low load conditions, and a lower compression ratio during high load conditions. Known techniques include using "sub-chambers" and "sub-pistons" to vary the volume of a cylinder (see, for example. U.S. Pat. Nos. 4,246,873 and 4,286,552), varying the actual dimensions of all or a portion of a piston attached to a fixed length connecting rod (see U.S. Pat. No. 5,865,092), and varying the actual length of a connecting rod (see U.S. Pat. No. 5,724,863).

Other techniques include the use of eccentric rings or bushings either at the lower "large" end of a connecting rod or the upper "small" end of the connecting rod for varying the effective length of the connecting rod or height of a reciprocating piston. U.S. Pat. Nos. 5,417,185, 5,562,068 and 5,960,750 and Japanese Publication JP-03092552 disclose devices that include eccentric rings. These eccentric ring devices, however, are undesirable in that each eccentric ring must be rotated 180 degrees before one of the desired operating modes or positions is engaged. As a result, locking of the eccentric ring in a proper position may not occur within an optimum period of time, thereby leaving the effective length of the device and consequently the compression ratio of an associated cylinder in an undesired intermediate state.

SUMMARY OF INVENTION

The invention addresses the shortcomings of the prior art by providing a connecting rod assembly that may be transitioned quickly and reliably between two or more compression modes without requiring rotation of an eccentric ring member about a crankpin or wrist pin.

The connecting rod assembly of the invention is configured to vary a compression ratio of an internal combustion engine having a crankshaft and a piston. The connecting rod assembly includes a first portion adapted to be connected to the crankshaft, and a second portion adapted to be connected to the piston and movable with respect to the first portion. The connecting rod assembly further includes a locking mechanism disposed between the first and second portions. The locking mechanism includes a rotatable locking element that is configured to lock the second portion at a first position relative to the first portion. Furthermore, the first position corresponds to a first compression ratio of the engine.

DETAILED DESCRIPTION

Figure 1:
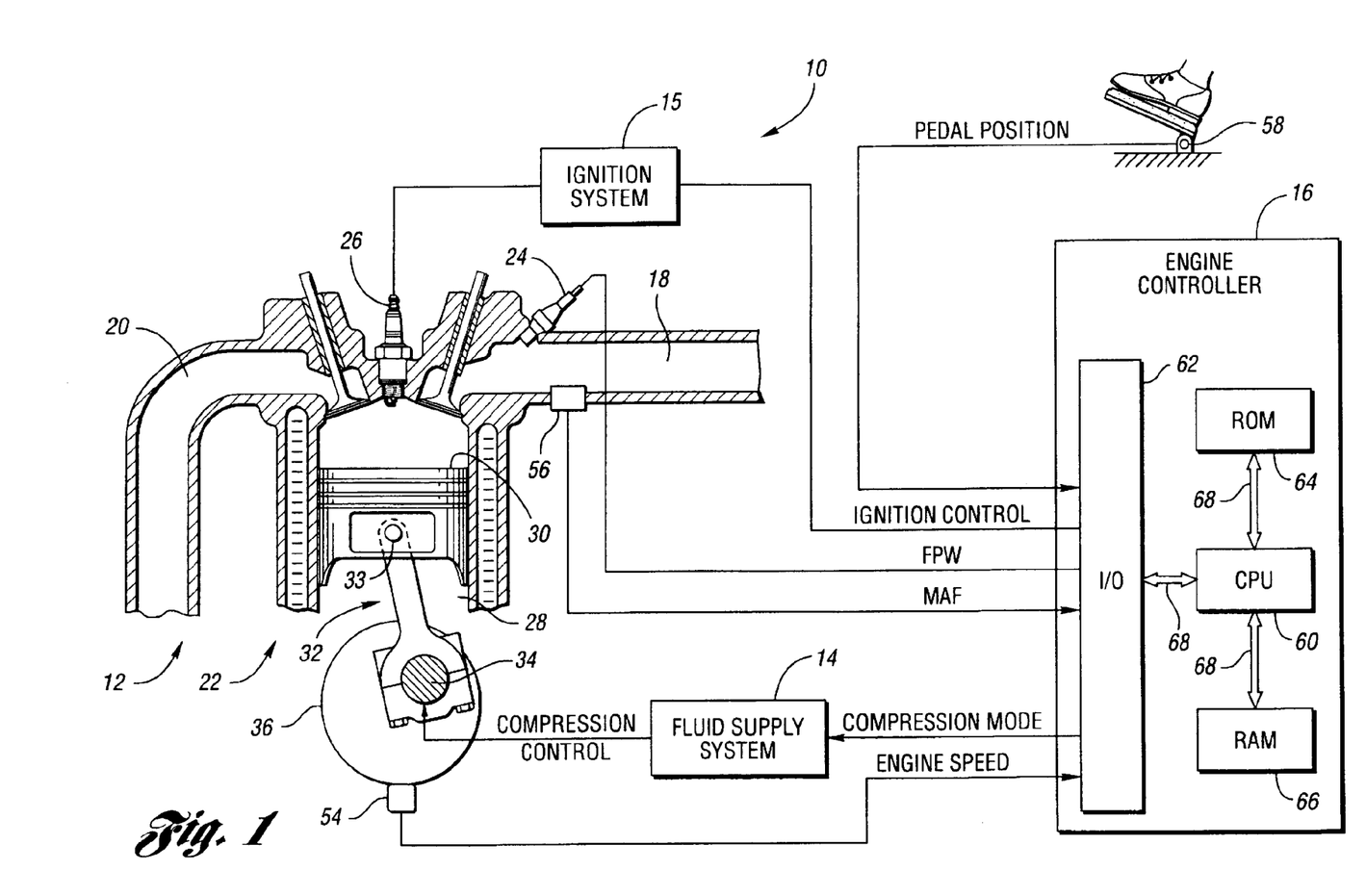
FIG. 1 is a diagram of a variable compression ratio system according to the invention including a variable compression ratio internal combustion engine, a fluid supply system and an engine controller in communication with the engine and the fluid supply system.
Figure 2:
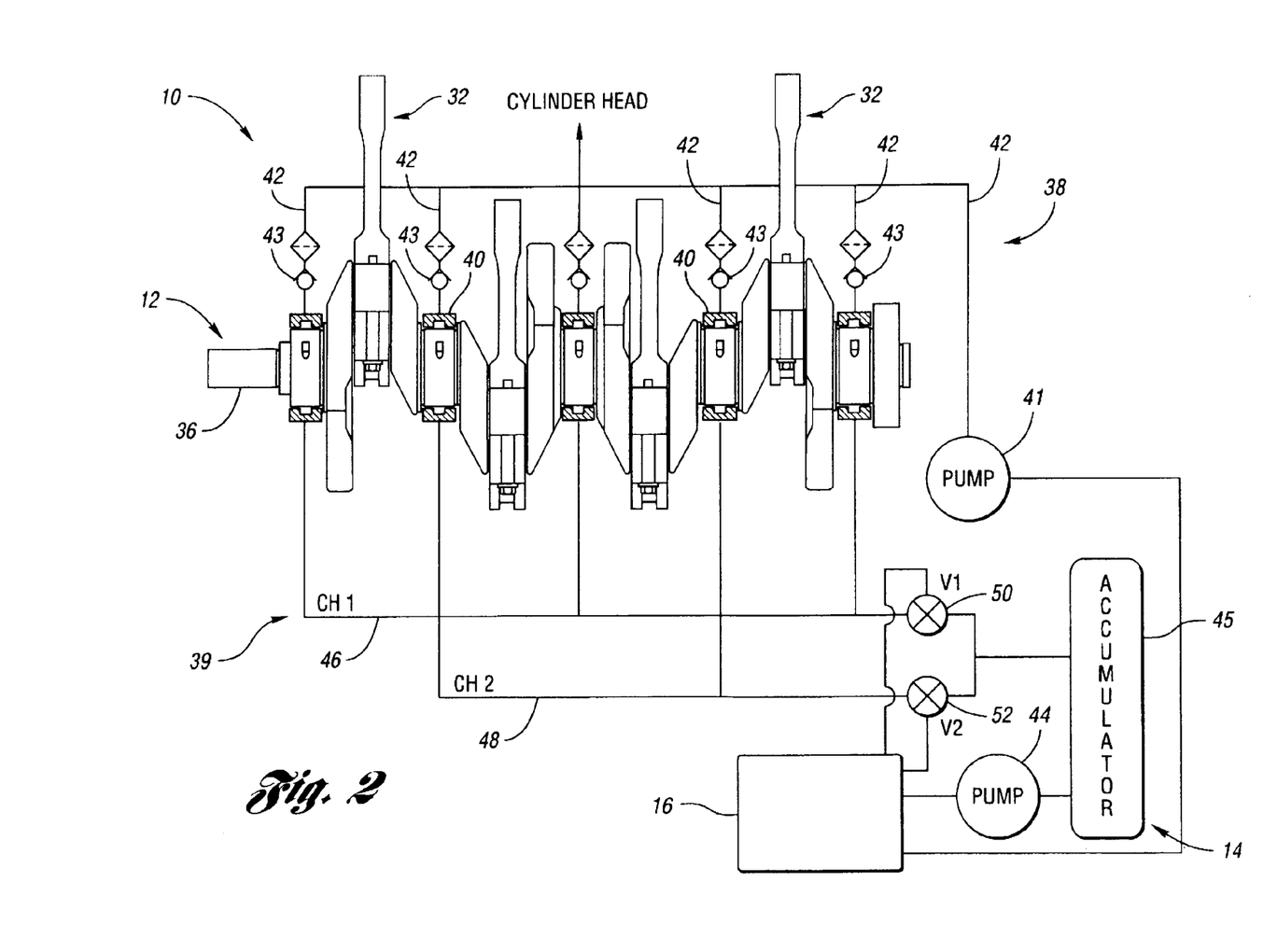
FIG. 2 is a diagram of the system of FIG. 1 showing multiple connecting rod assemblies of the engine.

FIGS. 1 and 2 show diagrams of a variable compression ratio system 10 according to the invention for use with a vehicle (not shown). The system 10 includes a variable compression ratio internal combustion engine 12, a fluid supply system 14 and an engine controller 16 in electrical communication with the engine 12 and fluid supply system 14. While the engine 12, fluid supply system 14 and engine controller 16 are shown as separate components, the fluid supply system 14 and engine controller 16 may each be considered part of the engine 12.

The engine 12 shown in FIG. 1, by way of example and not limitation, is a gasoline, four-stroke, port fuel injection, internal combustion engine. Alternatively, the engine 12 may be any internal combustion engine, such as a direct fuel injection engine or a diesel engine. The engine 12 includes an air intake manifold 18, an exhaust manifold 20 and a plurality of cylinders 22 (only one shown) connected to the manifolds 18 and 20. Each of the cylinders 22 is fed fuel by one or more fuel injectors 24 and is supplied with an ignition spark by a spark plug 26. Furthermore, each cylinder 22 has a combustion chamber 28 for receiving a reciprocating piston 30. Each piston 30 is coupled to a connecting rod assembly 32 with a wrist pin 33, and each connecting rod assembly 32 is coupled to a crankpin 34 of a crankshaft 36.

Each connecting rod assembly 32 is in fluid communication with the fluid supply system 14, and is operative to vary the compression ratio of the engine 12 as explained below in greater detail. "Compression ratio" for a particular cylinder 22 is defined as the ratio of the volume in combustion chamber 28 above the piston 30 when the piston 30 is at bottom-dead-center (BDC) to the volume in the combustion chamber 28 above the piston 30 when the piston 30 is at top-dead-center (TDC). Although each connecting rod assembly 32 is described below as providing first and second or high and low compression ratios, each connecting rod assembly 32 may be configured to provide one or more intermediate compression ratios for the engine 12.

Referring to FIG. 2, the fluid supply system 14 includes first and second portions 38 and 39, respectively, that supply pressurized oil to the engine 12. First portion 38 is configured to provide oil at a first pressure to crankshaft bearings 40 for lubrication purposes. First portion 38 includes a first pump 41 and a lubrication passage arrangement 42 having check valves 43. The first pump 41 may draw oil from a reservoir (not shown), which collects oil that drains from the engine 12.

Second portion 39 is configured to provide pressurized oil to the connecting rod assemblies 32 so as to cause a change in the effective length of the connecting rod assemblies 32, and thereby vary the compression ratio of the engine 12, as explained below in greater detail. Second portion 39 may, for example, provide oil at a second pressure greater than the first pressure, and includes a second pump 44, an accumulator 45 connected to the second pump 44, and first and second passage arrangements 46 and 48, respectively, connected to the accumulator 45. Like the first pump 41, the second pump 44 may draw oil from the reservoir (not shown). Furthermore, first passage arrangement 46 includes a first valve 50, and second passage arrangement 48 includes a second valve 52.

The fluid supply system 14 and connecting rod assemblies 32 may be operated to effect a change in the compression ratio of the engine 12 in accordance with one or more operating parameters, such as engine load and speed. Referring to FIG. 1, such parameters may be measured by appropriate sensors, such as crankshaft speed sensor 54, mass air flow (MAF) sensor 56 and pedal position sensor 58, which are electronically coupled to the engine controller 16.

The engine controller 16 includes a central processing unit (CPU) 60, input/output ports 62, read-only memory (ROM) 64 or any suitable electronic storage medium containing processor-executable instructions and calibration values, random-access memory (RAM) 66, and a data bus 68 of any suitable configuration. The engine controller 16 receives signals from a variety of sensors, such as sensors 54, 56 and 58, and controls operation of the fluid supply system 14, the fuel injectors 24 and the spark plugs 26.

FIGS. 3 through 6 show one connecting rod assembly 32 according to the invention. The connecting rod assembly 32 includes a first portion, such as bearing retainer 69, that is adapted to be rotatably coupled to crankpin 34, and a second portion, such as body portion 70, that is adapted to be rotatably coupled to wrist pin 33. The bearing retainer 69 is configured to retain a bearing 71 between the bearing retainer 69 and the crankpin 34, and includes a bearing retainer axis 72 that is coincident with crankpin axis 73. The bearing retainer 69 may further include first and second sections 74 and 75, respectively, that are joined together in any suitable manner, such as with bolts, screws or other suitable fasteners (not shown). In addition, the bearing retainer 69 includes first and second continuous, circumferential grooves or channels 76 and 77 that receive fluid from fluid supply system 14.

The body portion 70 has a lateral axis 78 that is coincident with wrist pin axis 79. The body portion 70 also has a longitudinally extending body portion axis 80 and a body portion plane 81 that extends through the body portion axis 80 and bisects the body portion 70. In addition, the body portion 70 includes first and second sections 82 and 83, respectively, and each section 82 and 83 defines a generally semicircular aperture for receiving the bearing retainer 69. The sections 82 and 83 may be joined together in any suitable manner, such as with fasteners 84, so as to retain the bearing retainer 69 therebetween.

Figures 3, 4:
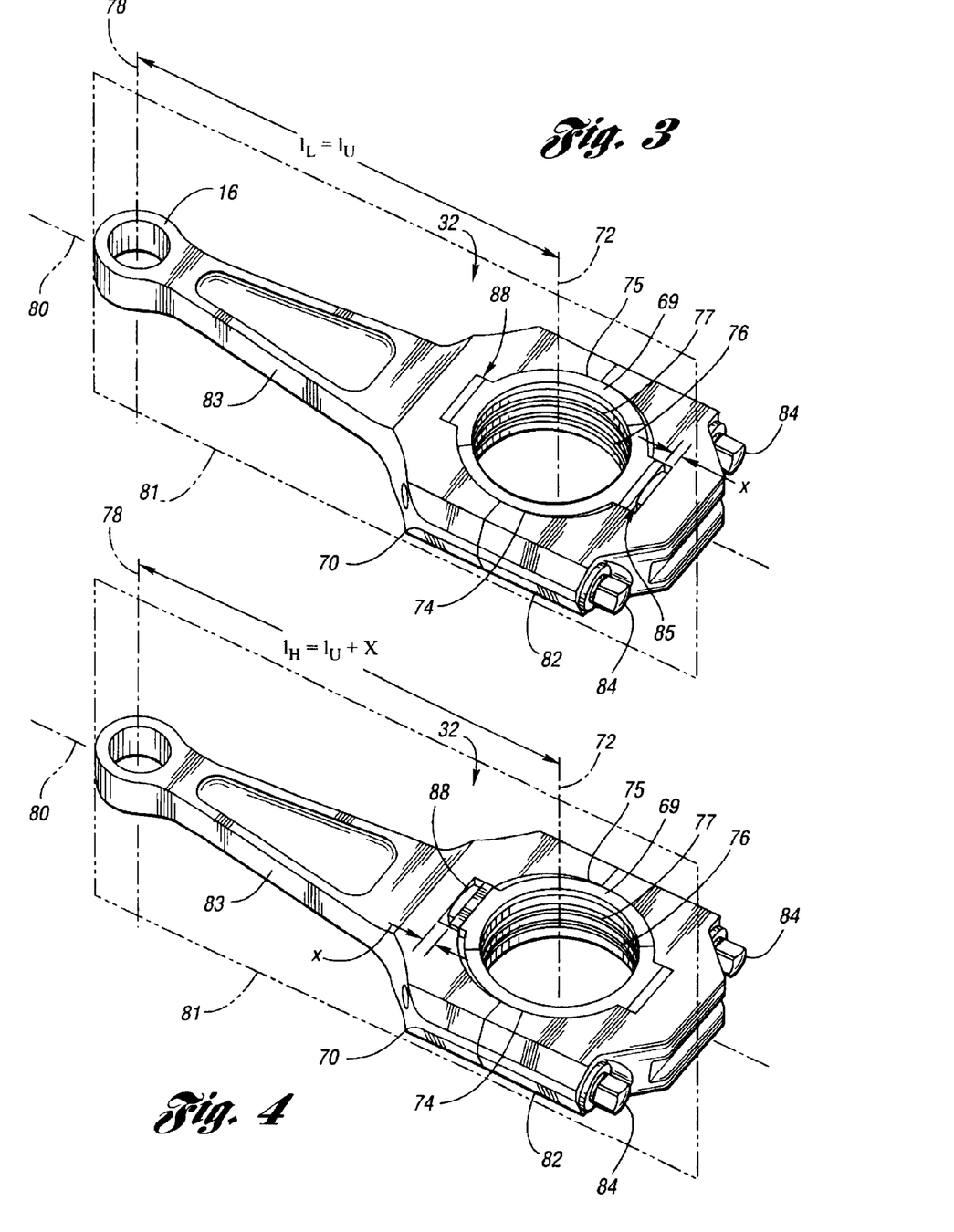
FIG. 3 is a perspective view of one connecting rod assembly shown in an unextended position.
FIG. 4 is a perspective view of the connecting rod assembly shown in an extended position.
Figure 5:
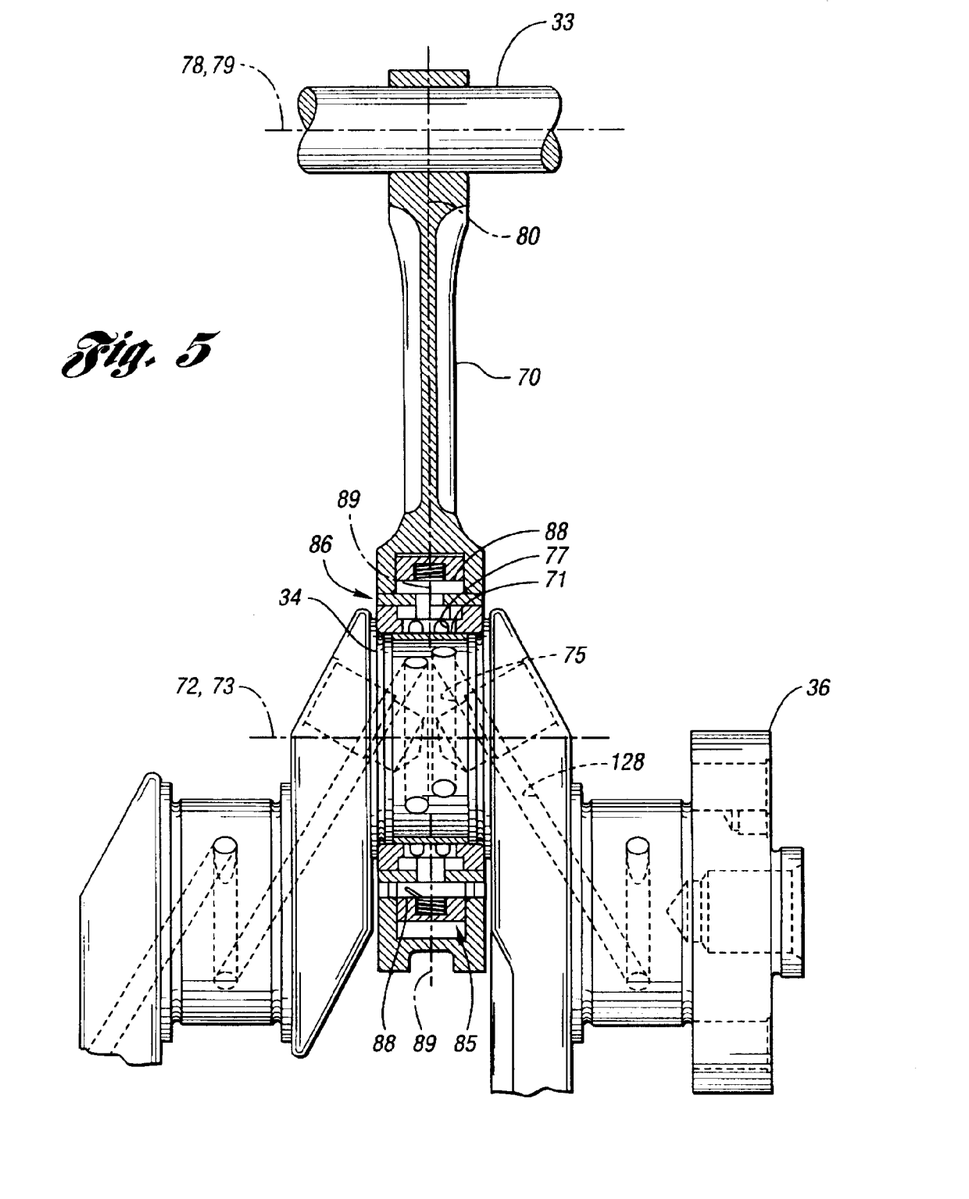
FIG. 5 is a cross-sectional view of the connecting rod assembly in the unextended position and including first and second locking mechanisms.
Figure 6:
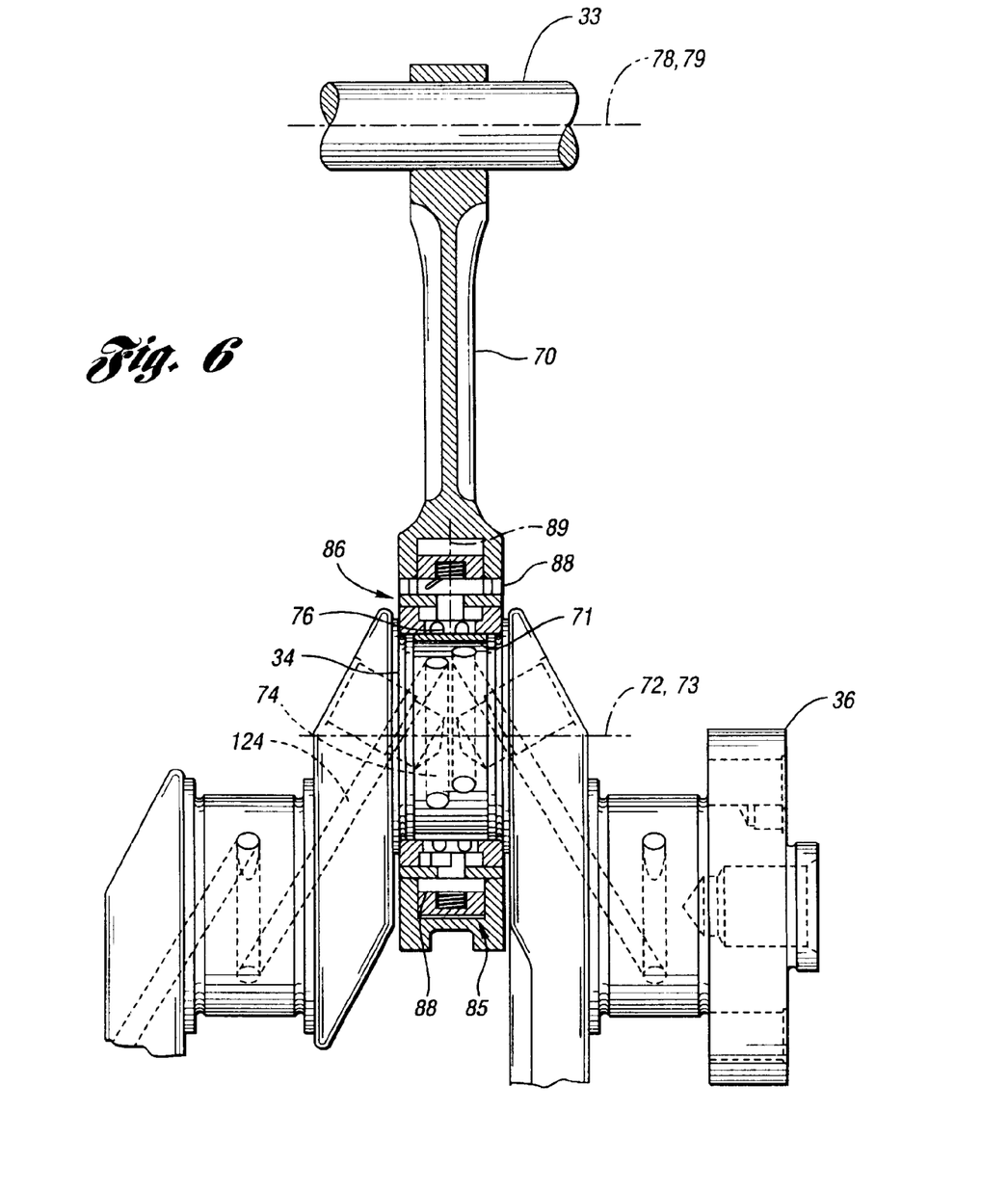
FIG. 6 is a cross-sectional view of the connecting rod assembly in the extended position.

Furthermore, the body portion 70 is axially movable with respect to the bearing retainer 69 between a first position, or unextended position shown in FIGS. 3 and 5, and a second position, or extended position shown in FIGS. 4 and 6. In the embodiment shown in FIGS. 3 through 6, for example, the body portion 70 is displaceable by a distance x. When the body portion 70 is in the unextended position, which corresponds to a first or low compression ratio mode of the engine 12, the effective length $l_L$ of the body portion 70 is equal to the unextended length $l_U$. When the body portion 70 is in the extended position, which corresponds to a second or high compression ratio mode of the engine 12, the effective length $l_H$ of the body portion 70 is equal to the extended length $l_U+x$. Thus, the body portion 70 is selectively displaceable with respect to the bearing retainer 69 so as to cause a change in the effective length of the body portion 70 and the compression ratio of the engine 12.

The connecting rod assembly 32 also includes first and second locking mechanisms 85 and 86, respectively, for locking the body portion 70 at the unextended and extended positions. Referring to FIGS. 5 and 6, each locking mechanism 85 and 86 includes a locking member or element 88 having a locking element axis 89 about which the locking element 88 may rotate. Preferably, but not necessarily, each locking element axis 89 is coincident with or otherwise aligned with the body portion axis 80. Each locking element 88 is rotatable between an unlocked position and a locked position in which the locking element 88 extends into a gap formed between the bearing retainer 69 and the body portion 70. More specifically, when a particular locking element 88 is in the locked position, the locking element 88 overlaps and is engaged with the bearing retainer 69 and the body portion 70 (the locking element 88 of the first locking mechanism 85 is shown in the locked position in FIG. 5 and the unlocked position in FIG. 6, and the locking element 88 of the second locking mechanism 86 is shown in the unlocked position in FIG. 5 and the locked position in FIG. 6).

Furthermore, when a particular locking element 88 is in the locked position, the locking element 88 preferably, but not necessarily, intersects the body portion plane 81 shown in FIG. 3. With such a configuration, the locking elements 88 inhibit rotational movement or twisting of the body portion 70 relative to the bearing retainer 69 when the locking elements 88 are compressively loaded.

Figure 7:
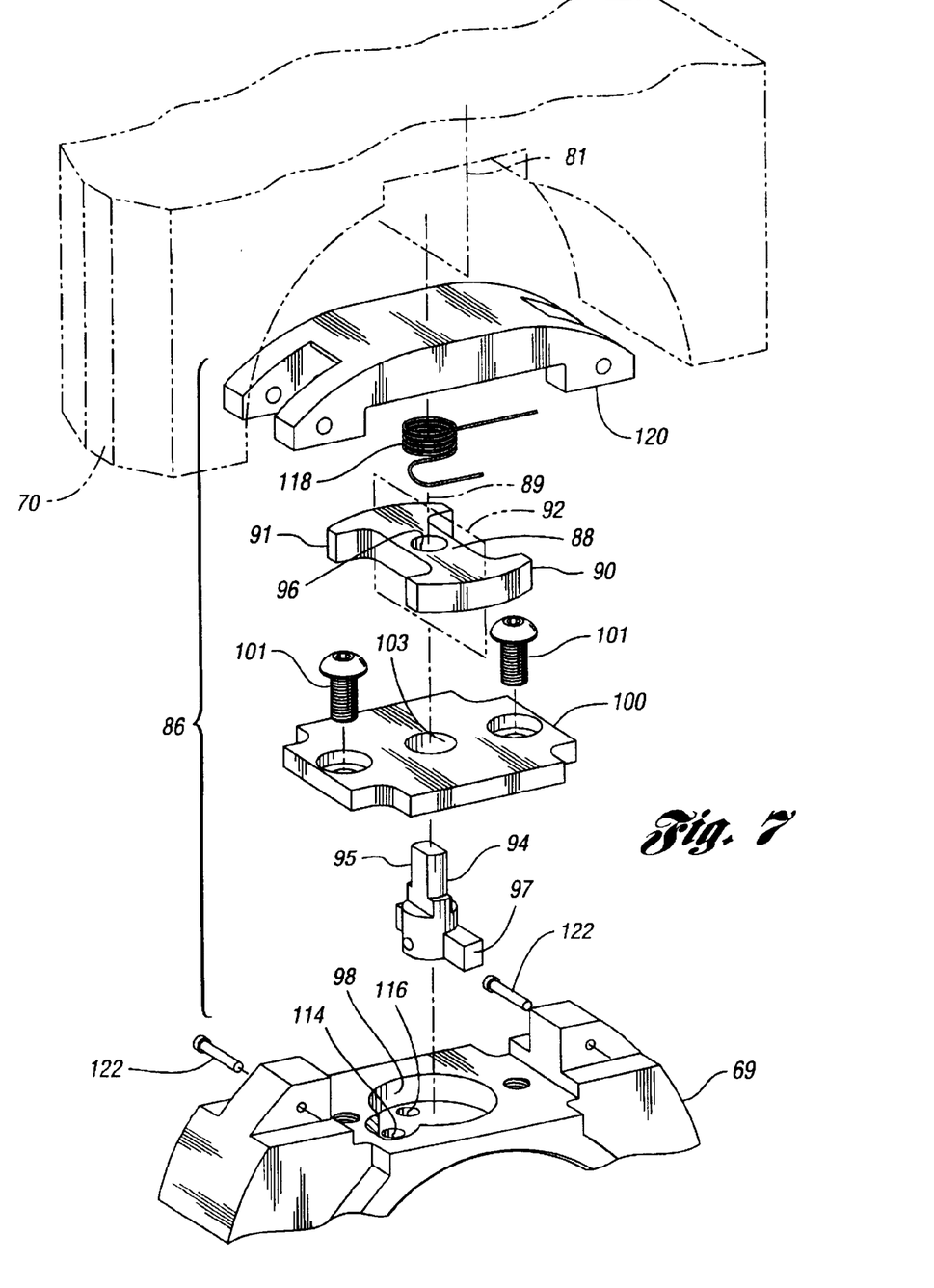
FIG. 7 is an exploded perspective view of a portion of the connecting rod assembly including the second locking mechanism.
Figure 8:
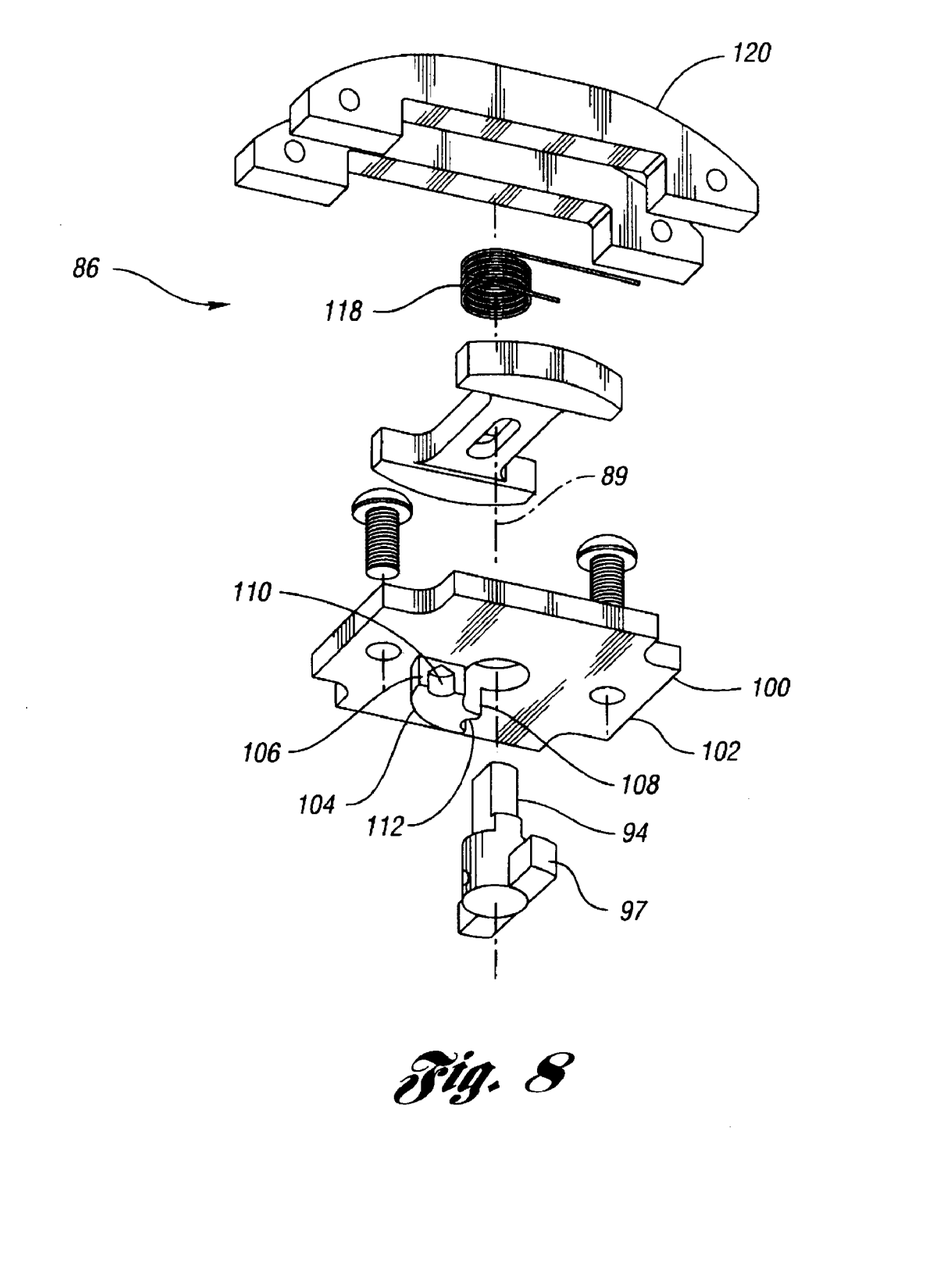
FIG. 8 is an exploded perspective view of the second locking mechanism.

Referring to FIGS. 7 and 8, additional features of the second locking mechanism 86 will now be described in detail. Because the first locking mechanism 85 is similar to the second locking mechanism 86, a thorough understanding of the first locking mechanism 85 will be apparent from the following description of the second locking mechanism 86. The locking element 88 of the first locking mechanism 85, however, is oriented 90 degrees in a clockwise direction relative to the locking element 88 of the second locking mechanism 86, such that the first locking mechanism 85 is in the unlocked position when the second locking mechanism 86 is in the locked position.

The locking element 88 of the second locking mechanism 86 includes first and second enlarged, arcuate ends 90 and 91, respectively, that are configured to overlap and engage the bearing retainer 69 and the body portion 70 when the locking element 88 is in the locked position, so as to create a compression fit between the bearing retainer 69 and the body portion 70. The locking element 88 also has a locking element plane 92 that bisects the locking element 88. Preferably, but not necessarily, the locking element plane 92 is aligned with the body portion plane 81 when the locking element 88 is in the locked position, such that compressive loading on the locking element 88 is generally uniform and symmetrical relative to locking element plane 92.

The second locking mechanism 86 further includes a rotatable pivot shaft 94 on which the locking element 88 is mounted or otherwise disposed, such that the locking element 88 is rotatable with the pivot shaft 94. The pivot shaft 94 includes a shaft portion 95 that extends through an aperture 96 of the locking element 88, and a base or vane portion 97 rotatably disposed at least partially in a generally cylindrical recess 98 of the bearing retainer 69.

A cover plate 100 is disposed between the locking element 88 and the vane portion 97, and is mounted to the bearing retainer 69, such as with fasteners 101, so as to retain the vane portion 97 at least partially in the recess 98. The plate 100 has a plate portion 102 and a projection 104 extending from the plate portion 102. The plate portion 102 has an aperture 103 for receiving the shaft portion 95 of the pivot shaft 94. The projection 104 defines first and second stops 106 and 108, respectively, that are engageable with the vane portion 97 so as to respectively stop the locking element 88 in the unlocked and locked positions. The projection 104 also has first and second grooves or channels 110 and 112, respectively, for routing fluid between the projection 104 and the vane portion 97. The first and second channels 110 and 112, respectively, are aligned with first and second apertures 114 and 116 of the bearing retainer 69 so as to receive pressurized fluid from the fluid supply system 14, as explained below in detail (the bearing retainer 69 is partially broken away in FIG. 7 to show the first aperture 114).

The second locking mechanism 86 further includes a spring, such as a torsion spring 118, disposed about the shaft portion 95 and engaged with the locking element 88 for urging the locking element 88 toward the locked position. In addition, the second locking mechanism 86 includes a cover or cap 120 attached to the bearing retainer 69 for retaining the locking element 88 and spring 118 on the bearing retainer 69. While the cap 120 may be attached to the bearing retainer 69 in any suitable manner, in the embodiment shown in FIG. 7, the cap 120 is attached to the bearing retainer 69 with fasteners 122.

Referring to FIGS. 3 through 7, a method for mounting the connecting rod assembly 32 on the crankshaft 36 will now be described. The method includes attaching first locking mechanism 85 to first section 74 of bearing retainer 69. The method further includes attaching second locking mechanism 86 to second section 75 of bearing retainer 69. The method further includes securing first and second sections 74 and 75 around crankpin 34 of crankshaft 36, such as with fasteners or by any other suitable means. Next, the method involves positioning first section 82 of body portion 70 over first locking mechanism 85, such that first locking mechanism 85 is received in a portion of an aperture defined by first section 82. The method further includes moving the locking element 88 of the first locking mechanism 85 to the unlocked position. Next, the method involves positioning second section 83 of body portion 70 over second locking mechanism 86, such that second locking mechanism 86 is received in a portion of an aperture defined by second section 83. The method further includes securing first section 82 to second section 83 in any suitable manner, such as with fasteners 84. Fasteners 84 may be, for example, bolts or screws.

Referring to FIGS. 2 and 5 through 8, operation of the system 10 will now be described in detail. When the engine controller 16 determines that it is desirable to change the compression ratio of the engine 12, based on one or more operating parameters, the engine controller 16 may control operation of fluid supply system 14 so as to supply pressurized oil from second portion 39 to the connecting rod assemblies 32. For example, if the engine controller 16 determines that it is desirable to change from high compression ratio mode shown in FIG. 6 to low compression ratio mode shown in FIG. 5, the engine controller 16 may open first valve 50 of fluid supply system 14 for a predetermined amount of time, such as 100 to 300 milliseconds, while keeping second valve 52 closed. As a result, pressurized oil is routed through first passage arrangement 46, and a pressure differential is created across the first and second passage arrangements 46 and 48, respectively, which activates the locking mechanisms 85 and 86 of the connecting rod assemblies 32.

More specifically, referring to FIGS. 6, 7 and 8, pressurized oil from first passage arrangement 46 may travel through first crankshaft passage arrangement 124 and first bearing aperture or apertures (not shown) in bearing 71, and then into first channel 76 of bearing retainer 69. Next, pressurized oil passes through second aperture 116 of bearing retainer 69 and into recess 98 and second channel 112 of second locking mechanism 86. The pressurized oil acts on vane portion 97 of pivot shaft 94 so as to cause the pivot shaft 94 and locking element 88 of the second locking mechanism 86 to rotate approximately 90 degrees until vane portion 97 contacts first stop 106. In other words, the pressurized oil causes the locking element 88 of the second locking mechanism 86 to rotate from the locked position shown in FIGS. 6 and 8 to the unlocked position shown in FIG. 5.

With both locking mechanisms 85 and 86 in the unlocked position, the body portion 70 is able to move axially relative to the bearing retainer 69 from the extended position shown in FIG. 6 to the unextended position shown in FIG. 5. Such movement occurs as a result of inertia of the body portion 70. Once the body portion 70 reaches the unextended position, pressurized oil from first channel 76 acts on first locking mechanism 85, in a similar manner as described above with respect to second locking mechanism 86, so as to cause the locking element 88 of the first locking mechanism 85 to rotate to the locked position shown in FIG. 5.

When the engine controller 16 determines that it is desirable to change back to high compression mode, the engine controller 16 may control operation of the fluid supply system 14 so as to route pressurized oil through the second passage arrangement 48. Next, pressurized oil may travel through second crankshaft passage arrangement 128 and second bearing aperture or apertures (not shown) in bearing 71, and then into second channel 77 of bearing retainer 69. Pressurized oil passing from second channel 77 then acts on the first locking mechanism 85 so as to move the locking element 88 to the unlocked position, thereby allowing the body portion 70 to move from the unextended position shown in FIG. 5 to the extended position shown in FIG. 6. Once the body portion 70 reaches the extended position, pressurized oil passing from second channel 77 acts on second locking mechanism 86 so as to cause the locking element 88 to rotate to the locked position shown in FIG. 6.

The connecting rod assembly 32 of the invention includes several beneficial aspects. First, as shown in the FIGS. 6 and 7, the locking mechanisms 85 and 86 may be disposed entirely between the bearing retainer 69 and the body portion 70, so that no additional housing portions, such as extruded housing portions, are required to contain the locking mechanisms 85 and 86. Thus, the connecting rod assembly 32 can be utilized with conventional crankshafts with minimal, if any, additional machining being required on the crankshafts. Further, each locking mechanism 85 and 86 may include only one locking element 88, such that the connecting rod assembly 32 may be cost-effectively manufactured. Still further, each locking element 88 is compressively loaded, rather than shear loaded, between the bearing retainer 69 and the body portion 70 when the locking element 88 is in the locked position. Such compressive loading reduces the possibility of bending the locking elements 88. Furthermore, the locking elements 88 may be appropriately configured such that the compressive loading occurs along the body portion plane 81, thereby inhibiting rotation or twisting of the body portion 70 relative to the bearing retainer 69.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A connecting rod assembly for varying a compression ratio of an internal combustion engine, the engine having a crankshaft and a piston, the connecting rod comprising:
   a first portion adapted to be connected to the crankshaft;
   a second portion adapted to be connected to the piston and movable with respect to the first portion; and
   a locking mechanism disposed between the first and second portions, the locking mechanism including a locking element that is rotatable about a longitudinal locking element axis to lock the second portion at a first position relative to the first portion, the first position corresponding to a first compression ratio of the engine.

2. The connecting rod assembly of claim 1 wherein the second portion has a longitudinally extending axis that extends in a first direction, and the locking element axis also extends in the first direction, the locking element being rotatable about the locking element axis between an unlocked position and a locked position.

3. The connecting rod assembly of claim 1 wherein the locking element axis extends longitudinally through the second portion, and the locking element is rotatable about the looking element axis between an unlocked position and a locked position.

4. The connecting rod assembly of claim 1 wherein the locking element has first and second ends and is rotatable between an unlocked position and a locked position, wherein when the locking element is in the unlocked position, neither end overlaps the second portion, and when the locking element is in the locked position, each end overlaps the second portion.

5. The connecting rod assembly of claim 4 wherein the second portion has a plane that bisects the second portion, and wherein when the locking element is in the locked position, each end intersects the plane of the second portion.

6. The connecting rod assembly of claim 5 wherein the locking element has a locking element plane that bisects the locking element, and wherein when the locking element is in the locked position, the locking element plane is generally aligned with the plane of the second portion.

7. The connecting rod assembly of claim 1 wherein the second portion has a plane that bisects the second portion, and the locking element is rotatable between an unlocked position and a locked position, wherein when the locking element is in the locked position, the locking element intersects the plane of the second portion.

8. The connecting rod assembly of claim 1 wherein the second portion has a plane that bisects the second portion, the locking element has a locking element plane that bisects the locking element, and the locking element is rotatable between an unlocked position and a locked position, wherein when the locking element is in the locked position, the locking element plane is generally aligned with the plane of the second portion.

9. The connecting rod assembly of claim 1 wherein the locking mechanism includes a pivot shaft that is movably associated with the first portion, and the locking element is disposed on the pivot shaft and movable therewith.

10. The connecting rod assembly of claim 9 wherein the first portion includes a recess that defines a fluid chamber for receiving pressurized fluid, and the pivot shaft includes a base that is disposed in the recess, the base being rotatable in response to pressurized fluid entering the recess.

11. The connecting rod assembly of claim 10 wherein the locking element is rotatable between an unlocked position and a locked position, and the locking mechanism further includes a plate disposed between the locking element and the base, the plate having first and second stops that are engageable with the base so as to inhibit rotation of the pivot shaft and the locking element, the first stop corresponding to the unlocked position of the locking element, and the second stop corresponding to the locked position of the locking element.

12. The connecting rod assembly of claim 10 further comprising a spring engaged with the locking element for urging the locking element toward the locked position.

13. The connecting rod assembly of claim 1 further comprising an additional locking mechanism including an additional rotatable locking element that is configured to lock the second portion at a second position relative to the first portion, the second position corresponding to a second compression ratio of the engine, wherein the second compression ratio is larger than the first compression ratio.

14. A connecting rod assembly for varying a compression ratio of an internal combustion engine, the engine including a cylinder, a reciprocating piston disposed within the cylinder, and a crankshaft having a crankpin, the connecting rod comprising:
   a bearing retainer adapted to be connected to the crankpin;
   a body portion adapted to be connected to the piston, the body portion having a longitudinal body portion axis that extends in a first direction, and a body portion plane that extends through the body portion axis and bisects the body portion, the body portion further being axially movable with respect to the bearing retainer to effect a selective displacement of the body portion relative to the bearing retainer, the displacement causing a change in the effective length of the body portion and the compression ratio of the engine;
   first and second locking mechanisms disposed between the bearing retainer and the body portion, the first locking mechanism including a first locking element, the second locking mechanism including a second locking element, each locking element having a locking element axis that extends generally in the first direction, each locking element being rotatable about a respective locking element axis between an unlocked position and a locked position in which the locking element intersects the plane of the body portion, the first locking element being configured to lock the body portion at a first position relative to the bearing retainer when the first locking element is in the locked position and the second locking element is in the unlocked position, the first position corresponding to a first compression ratio of the engine, and the second locking element being configured to lock the body portion at a second position relative to the bearing retainer when the second locking element is in the locked position and the first locking element is in the unlocked position, the second position corresponding to a second compression ratio of the engine, wherein the second compression ratio is larger than the first compression ratio.

15. The connecting rod assembly of claim 14 wherein each locking element has a locking element plane that bisects the locking element, and wherein when a particular locking element is in the locked position, the locking element plane of the particular locking element is generally aligned with the body portion plane.

16. The connecting rod assembly of claim 15 wherein each locking element has first and second ends, and wherein when a particular locking element is in the locked position, each end of the particular locking element is engaged with the second portion.

17. A variable compression engine comprising:
   a crankshaft;
   a reciprocating piston;
   a connecting rod assembly including a first portion connected to the crankshaft, a second portion connected to the piston and movable with respect to the first portion, and a locking mechanism disposed between the first and second portions, the locking mechanism including a locking element that is rotatable about a longitudial locking element axis to lock the second portion at a first position relative to the first portion, the first position corresponding to a first compression ratio of the engine.

18. The engine of claim 17 wherein the second portion has a longitudinally extending axis that extends in a first direction, and the locking element axis also extends in the first direction, the locking element being rotatable about the locking element axis between an unlocked position and a locked position.

19. The engine of claim 17 wherein the locking element axis extends longitudinally through the second portion, and the locking element is rotatable about the axis between an unlocked position and a locked position.

20. The engine of claim 17 wherein the locking element has first and second ends and is rotatable between an unlocked position and a locked position, wherein when the locking element is in the unlocked position, neither end overlaps the second portion, and when the locking element is in the locked position, each end overlaps the second portion.

21. The engine of claim 20 wherein the second portion has a plane that bisects the second portion, and wherein when the locking element is in the locked position, each end intersects the plane of the second portion.

22. The engine of claim 21 wherein the locking element has a locking element plane that bisects the locking element, and wherein when the locking element is in the locked position, the locking element plane is generally aligned with the plane of the second portion.

23. The engine of claim 17 wherein the second portion has a plane that bisects the second portion, and the locking element is rotatable between an unlocked position and a locked position, wherein when the locking element is in the locked position, the locking element intersects the plane of the second portion.

24. The engine of claim 17 wherein the second portion has a plane that bisects the second portion, the locking element has a locking element plane that bisects the locking element, and the locking element is rotatable between an unlocked position and a locked position, wherein when the locking element is in the locked position, the locking element plane is generally aligned with the plane of the second portion.

25. The engine of claim 17 wherein the locking mechanism includes a pivot shaft that is movably associated with the first portion, and the locking element is disposed on the pivot shaft and movable therewith.

26. The engine of claim 25 wherein the first portion includes a recess that is configured to receive pressurized fluid, and the pivot shaft includes a base that is disposed in the recess, the base being rotatable in response to pressurized fluid entering the recess.

27. The engine of claim 26 further comprising a fluid supply system for supplying the pressurized fluid to the recess, and an engine controller in communication with the fluid supply system for controlling the fluid supply system.

28. The engine of claim 26 wherein the locking element is rotatable between an unlocked position and a locked position, and the locking mechanism further includes a plate disposed between the locking element and the base, the plate having first and second stops that are engageable with the base so as to inhibit rotation of the pivot shaft and the locking element, the first stop corresponding to the unlocked position of the locking element, and the second stop corresponding to the locked position of the locking element.

29. The engine of claim 28 further comprising a spring engaged with the locking element for urging the locking element toward the locked position.

30. The engine of claim 17 further comprising an additional locking mechanism including an additional rotatable locking element that is configured to lock the second portion at a second position relative to the first portion, the second position corresponding to a second compression ratio of the engine, wherein the second compression ratio is smaller than the first compression ratio.

31. A method for varying the compression ratio of an internal combustion engine having a crankshaft, a reciprocating piston, and a connecting rod assembly connected between the crankshaft and the piston, the connecting rod assembly having a bearing retainer connected to the crankshaft, and a body portion connected to the piston and movable with respect to the bearing retainer, the method comprising:
   allowing the body portion of the connecting rod assembly to move to a first position relative to the bearing retainer so as to change the effective length of the body portion, the first position corresponding to a first compression ratio of the engine; and
   locking the body portion in the first position by causing a rotatable locking element of the connecting rod assembly to rotate about a longitudinal axis into a locked position.

32. The method of claim 31 further comprising:
   unlocking the body portion from the first position by causing the locking element to rotate to an unlocked position;
   allowing the body portion to move to a second position relative to the bearing retainer, the second position corresponding to a second compression ratio of the engine; and
   locking the body portion in the second position by causing an additional rotatable locking element of the connecting rod assembly to rotate into a locked position.

* * * * *